Sept. 30, 1947.  O. J. CANNARILI ET AL  2,428,201

TOOL GUIDE

Filed June 26, 1945

INVENTORS
ORTENZIO J. CANNARILI
FRANK T. KLUMPP
BY
Blair, Curtis & Hayward
ATTORNEYS

Patented Sept. 30, 1947

2,428,201

UNITED STATES PATENT OFFICE 2,428,201

TOOL GUIDE

Ortenzio J. Cannarili, Brooklyn, and Frank T. Klumpp, Bronx, N. Y.

Application June 26, 1945, Serial No. 601,580

2 Claims. (Cl. 77—62)

This invention relates to improvements in the performing of extremely accurate tooling operations such as precision drilling and the like.

An object of this invention is to provide a method and apparatus for insuring the exact positioning of working tools during working operations. A further object is to provide a dependable manner of accurately aligning a boring tool so that a hole produced or finished by it will be in the exact position desired. A further object is to provide a method and apparatus for accurately positioning the holes in a work piece in a practical and dependable manner. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawing in which are shown two of the many embodiments of the invention:

In the past difficulty has been encountered in accurately positioning tools for operations such as the drilling and reaming of holes in work pieces. With certain types of work it is desirable that holes be positioned in a work piece with a tolerance of only one-thousandth of an inch. For example, in making a die or jig (herein called the work piece) an initial error in the location of a hole will cause errors to occur in all of the subsequent operations on the items with which the die or jig is used. Generally such errors cannot be corrected and they render the work piece useless so that the operator must start over again with resultant loss of time and materials. If an error occurs when a work piece is partially completed the loss may be very substantial.

Various means have been proposed to aid operators in their work, but these have not been fully satisfactory. For example, an operator may work while looking through a magnifying glass or a microscope, and thus attempt to position a tool accurately; he may produce a punch mark to indicate the center of a hole to be drilled, and then use the punch mark to position the drill. This may give satisfactory results, but it is tedious and difficult. Furthermore, even with great care the tool may be improperly positioned. For example, if the surface hardness of the metal is uneven, the punch or other tool may be deflected to the side; and, even under ideal conditions, the accuracy of the results depends upon the skill with which the operator works. There have been proposals to guide a drill by means of a clamp which carries a drill guide, but these devices are unduly complicated and are of the nature of specific jigs for each particular hole to be drilled. It is an object of the present invention to avoid the difficulties of the prior art and to permit even unskilled workmen to do accurate work without the aid of complicated apparatus.

In accordance with the present invention, the operator provides markings indicating on the work piece the exact location where the tool is to operate. Thereafter, the markings are used to position a tool guide on the work piece, and the tool guide is then held in place while working operations are performed. The tool guide may be used merely for making an accurate indication such as a punch mark, and after this indication is produced the tool guide may be removed. However, under most circumstances it is desirable to use the tool guide for all of the major working operations. The tool guide is simple and is easily used without the assistance of complicated visual aids.

Figure 1:
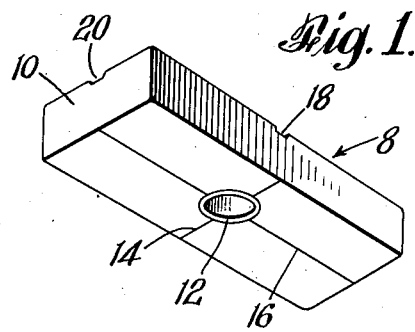
Figure 1 is a bottom perspective view of a tool guide.
Figure 3:
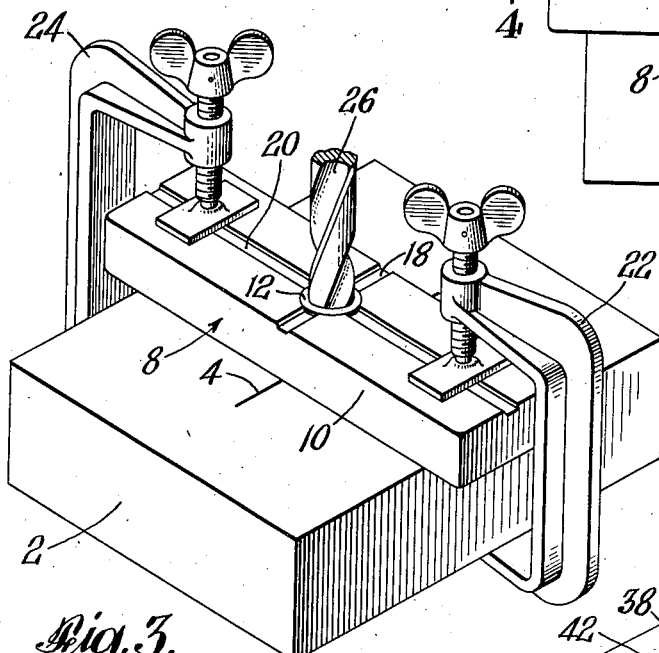
Figure 3 is an enlarged perspective view showing the tool guide clamped in place and a drill positioned for boring a hole in the work piece.

Referring particularly to Figure 1 of the drawings, a tool guide 8 is shown which is formed of a rectangular block 10 of transparent synthetic resin such as Lucite having a steel liner 12 rigidly embedded in the center of the block. Upon the lower surface of block 10 are two cross-hairs 14 and 16 at right angles to each other; these cross-hairs are along lines that cross exactly on the axis of the hole in liner 12. Referring to Figure 3, directly above these cross-hairs and cut into the upper surface of the block are two flat-bottomed openings or channels 18 and 20 so that the block portions in the bottoms of these channels form light transmitting media through which the cross-hairs may be observed from the top of the block.

Figure 2:
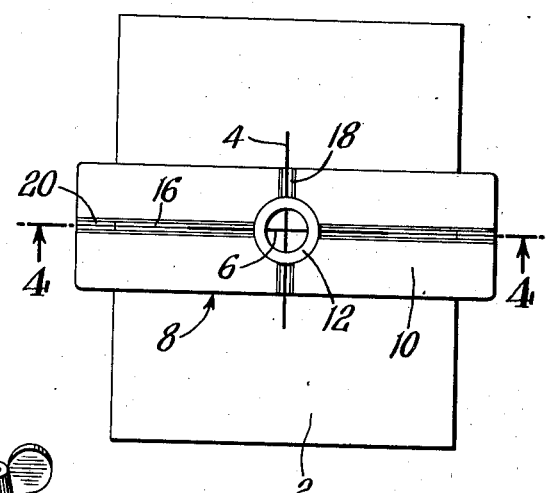
Figure 2 is a top-plan view of a work piece with the tool guide of Figure 1 positioned thereon.

Referring to Figure 2 of the drawing, illustratively, it is assumed to be desirable to produce a hole through a work piece 2 which hole has its center at the point the scribe lines 4 and 6 cross. The initial step is to color the top surface of the work piece, for example, with a coloring material such as a "layout blue," or blue stone, to give a relatively smooth thin coating. The scribe lines 4 and 6 are then formed, illustratively, at right angles to each other by using a height gauge with the machined edges of the work piece as guides. Then the tool guide 8 is placed on the work piece over the scribe lines and the tool guide may be slid manually until the cross-hairs 14 and 16 are directly over the respective scribe lines 4 and 6. This accurate alignment is easily observed from the top of the block because the cross-hairs are narrower than the scribe lines, and it is easy to move the tool guide until the cross-hairs tend to cover up or "split" the scribe lines. When the tool guide is accurately positioned with the cross-hairs respectively aligned with the scribe lines, the bore of liner 12 is along a line which it is desired will be the axis of the hole in the work piece.

The drill guide is thereafter clamped to the work piece, illustratively, as shown in Figure 3, using a pair of C-clamps 22 and 24. These C-clamps engage the top surface of the tool guide and they do not mar the bottom surface of channels 18 and 20. With the tool guide held in place, a hole is drilled using a drill 26, and thereafter the hole is reamed or otherwise finished as desired. Drill 26 is of the exact size of the hole in liner 12, and the liner is of hard steel so that the drill is accurately guided.

Figure 4:
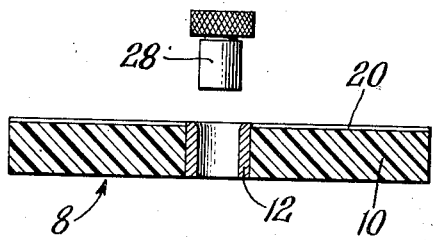
Figure 4 is a vertical section of the tool guide showing a removable liner; and, Figure 5 is a perspective view of another tool guide.

When more than one operation is being performed at one point, the tool guide is provided with one or more removable bushings, or the like, for properly positioning the various tools. For example as shown in Figure 4, tool guide 8 is provided with a removable bushing 28 which is tightly received in liner 12 and which may be used to guide a smaller drill, a reamer or a punch. A large number of removable bushings of different sizes may be provided so that the same tool guide may be used for many different operations. For example, when a punch mark is to be made and thereafter a hole is to be drilled and reamed, a punch is used having the outside diameter of liner 12 or of a removable liner and then separate removable liners are provided for the drill and the reamer.

It is thus seen that accurate holes or other recesses may be provided in the work piece by simple apparatus and without the usual visual aids. The hair lines are in direct contact with the scribe lines so that optical errors due to parallax are avoided. Furthermore, alignment is easily observed because each hair line tends to "split" and darken its scribe line when the hair line is directly over the center of the scribe line.

In this embodiment the block 10 is elongated so that hair line 16 extends further from the center of the hole than does hair line 14. This feature is of peculiar advantage when it is desirable to work at a point near the edge of the work piece. In this case, the block is positioned with one end extending over the edge of the work piece, and the alignment of hair line 16 with its scribe line is obtained by observing the hair line on only one side of the liner.

Figure 5:
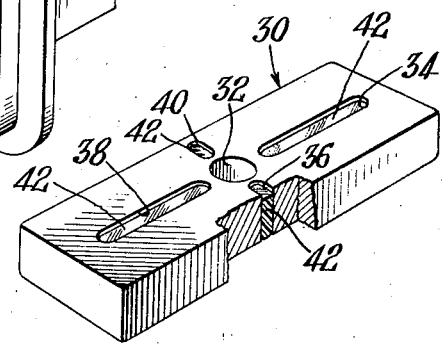

In the embodiment of Figure 5 a steel block 30 similar to block 10 of the other figures is provided with a central bore 32 which corresponds to the bore in liner 12. Block 30 also has four elongated holes 34, 36, 38 and 40 which are in aligned pairs. Each of these aligned holes is substantially filled by a block of plastic which forms a light transmitting media or lens member 42 the upper surface of which is a short distance below the upper surface of block 30. The lens members are provided along their lower surfaces with cross-hairs (not shown) similar to cross-hairs 14 and 16 in the other figures. These cross-hairs may be observed from the top of the block and are used in the same manner as are cross-hairs 14 and 16, and this tool guide may be used in a manner similar to tool guide 8.

As many possible embodiments may be made of the mechanical features of the above invention and as the art herein described might be varied in various parts, all without departing from the scope of the invention, it is to be understood that all matter hereinabove set forth, or shown in the accompanying drawing is to be interpreted as illustrative and not in a limiting sense.

We claim:

1. As an article of manufacture, a tool guide comprising, a substantially flat block of rigid material having parallel top and bottom surfaces and recessed to provide a plurality of openings between said surfaces, said openings including a central guide bore extending through the block and a plurality of light transmitting openings radially disposed with respect to said guide bore, and light transmitting media positioned in said light transmitting openings and having bottom surfaces substantially in the plane of the bottom surface of said block, said light transmitting media being formed with hair-lines on the bottom surfaces radially positioned with respect to said guide bore, whereby said tool guide may be positioned upon a work surface using said hair-lines and thereafter said guide bore may be used to guide a tool.

2. As an article of manufacture, a tool guide comprising, a substantially flat block construction of rigid material having parallel top and bottom surfaces and having a central guide bore extending through the block from said top surface to said bottom surface and being adapted to guide a tool projecting from above the block to a work surface beneath the block, and said block construction also having a plurality of light-transmitting recesses radially disposed with respect to said guide bore and extending from said top surface toward bottom surface, and light-transmitting media positioned beneath each of said light-transmitting recesses with top surfaces spaced beneath the top surface of the block thereby to minimize the contacting of said light-transmitting media from the top of the block, said light-transmitting media having bottom surfaces substantially in the plane of the bottom surface of said block construction with there being hair lines formed on said bottom surfaces of the light-transmitting media radially positioned with respect to said guide bore, whereby said tool guide may be positioned upon a work surface using said hair lines and thereafter said guide bore may be used to guide a tool.

ORTENZIO J. CANNARILL.
FRANK T. KLUMPP.

REFERENCES CITED

The following references are of record in the file of this patent:

UNITED STATES PATENTS

| Number | Name | Date |
|---|---|---|
| 2,333,134 | Whitlock | Nov. 2, 1943 |